United States Patent
Hashimoto et al.

(10) Patent No.: US 10,048,672 B2
(45) Date of Patent: Aug. 14, 2018

(54) MOTOR CONTROL DEVICE, MOTOR CONTROL METHOD, AND NON-TRANSITORY COMPUTER READABLE MEDIUM RECORDING MOTOR CONTROL PROGRAM

(71) Applicant: FANUC CORPORATION, Minamitsuru-gun, Yamanashi (JP)

(72) Inventors: Shoutarou Hashimoto, Yamanashi (JP); Tadashi Okita, Yamanashi (JP); Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/719,732

(22) Filed: Sep. 29, 2017

(65) Prior Publication Data

US 2018/0095446 A1    Apr. 5, 2018

(30) Foreign Application Priority Data

Oct. 4, 2016  (JP) ................................. 2016-196662

(51) Int. Cl.
*G05B 13/00*    (2006.01)
*G05B 19/404*    (2006.01)

(52) U.S. Cl.
CPC .. *G05B 19/404* (2013.01); *G05B 2219/41032* (2013.01)

(58) Field of Classification Search
CPC . G05B 11/01; G05B 13/00; G05B 5/00; B25J 19/02; H02P 6/00; H02P 6/14;

(Continued)

(56) References Cited

U.S. PATENT DOCUMENTS 5,101,146 A * 3/1992 Teshima ............... G05B 19/404
                                                    318/561
5,210,478 A * 5/1993 Sasaki .................. G05B 19/251
                                                    318/561

(Continued)

FOREIGN PATENT DOCUMENTS

JP        5596093        9/2014

*Primary Examiner* — Antony M Paul
(74) *Attorney, Agent, or Firm* — Wenderoth, Lind & Ponack, L.L.P.

(57) ABSTRACT

To provide a motor control device that prevents from becoming excessive correction, upon adding a backlash correction amount to a position command for a motor. Provided are: a positional error calculation part that calculates a positional error which is deviation between a converted first position detected value arrived at by converting a first position detected value which is the position of a movable part according to a rotation ratio between the movable part and the driven part, and a second position detected value which is the position of the driven part; and a position deviation calculation part that calculates a position deviation which is a difference between a position command and the second position detected value, in which the backlash correction part starts addition of the backlash correction amount when the variation of the positional error exceeds the first reference value, ends the addition of the backlash correction amount when the variation of the positional error exceeds the second reference value, and suspends the addition of the backlash correction amount when the position deviation becomes no more than the third reference value during correction.

13 Claims, 13 Drawing Sheets

(58) Field of Classification Search
CPC ...... H02P 1/00; H02P 3/00; H02P 5/00; H02P 1/46; H02P 3/18; H02P 23/00; H02P 27/00; H02K 29/10; G05D 3/00; G05D 3/12
USPC .. 318/12, 560, 561, 568.16, 568.18, 568.22, 318/611, 625, 628, 34, 127, 128, 700, 318/400.01, 400.4, 701, 702, 727, 779, 318/799, 798, 280, 282, 266, 286, 437, 318/466; 483/16, 17, 28, 30; 409/5, 146; 74/89.42, 640, 409, 490.03
See application file for complete search history.

(56) References Cited

U.S. PATENT DOCUMENTS

| | | | |
|---|---|---|---|
| 5,517,097 A * | 5/1996 | Hayashida | G05B 19/19 318/568.22 |
| 8,214,083 B2 * | 7/2012 | Kawai | A61B 1/00147 600/118 |
| 9,018,886 B2 | 4/2015 | Iwashita et al. | |
| 2014/0062378 A1 | 3/2014 | Iwashita et al. | |

* cited by examiner (d) IMMEDIATELY AFTER BACKLASH MOVEMENT (e) DELAYED DUE TO BELT ELASTIC DEFORMATION (c) DURING BACKLASH MOVEMENT (d) IMMEDIATELY AFTER BACKLASH MOVEMENT

MOTOR CONTROL DEVICE, MOTOR CONTROL METHOD, AND NON-TRANSITORY COMPUTER READABLE MEDIUM RECORDING MOTOR CONTROL PROGRAM

This application is based on and claims the benefit of priority from Japanese Patent Application No. 2016-196662, filed on 4 Oct. 2016, the content of which is incorporated herein by reference.

BACKGROUND OF THE INVENTION

Field of the Invention

The present invention relates to a motor control device having a means for correcting backlash, a motor control method, and a non-transitory computer readable medium encoded with a motor control program.

Related Art

Conventionally, servomotors have been used in a control system with the position, orientation, posture, etc. of an object as controlled variables, for example, in a control system of a machine tool or industrial machinery. For machine elements engaging together which are machine elements being used for transmitting the rotation of the motor shaft of a servomotor to another main spindle, a gap is intentionally provided at the mating surfaces between these machine elements. By way of this gap being present, machine elements such as screws and gears, for example, can rotate freely within a certain range. This gap is called "backlash".

For example, in the case of a motor and a driven shaft such as a spindle being coupled by gears, due to the backlash of gears being present, when reversing the motor, the reversing of the driven shaft will be delayed relative to the reversing of the motor. In order to correct for the reversal delay of this driven shaft, there already is known a method of adding a backlash correction amount to a position command for the motor.

In the case of not only gears, but also a belt being simultaneously used in the coupling of a motor and a driven shaft such as a spindle, due to the influence of the elasticity of the belt, driven shaft reversal delay may occur due to the backlash of gears which is delayed from the reversal of the motor. In this case, if adding a backlash correction amount to the position command for the motor immediately after reversal of the motor, there may be no effect of correction, or the correction may negatively influence the reversal operation of the driven shaft.

In order to solve this problem, the applicants of the present invention have already applied for a patent for determining the timing at which gears move within backlash by monitoring positional error which is a difference between the position of a motor and the position of a driven shaft, and then starting the addition of a backlash correction amount to the position command for the motor at the appropriate timing (Japanese Patent Application No. 2016-080416).

In the above-mentioned patent, determination for starting of backlash correction is performed by monitoring the variation in the positional error, and a change rate. On the other hand, although the timing for ending backlash correction is not particularly described, basically it is assumed that the backlash correction amount continues to be added to the position command for the motor until the gear stops movement within backlash. For example, in Patent Document 1, the backlash correction amount continues to be added until the motor end finishes moving the backlash length which was measured based on the positional error.

Patent Document 1: Japanese Patent No. 5596093

SUMMARY OF THE INVENTION

However, depending on the properties of the belt coupling between the motor shaft and driven shaft and the operating conditions, the delay in the position of the driven shaft relative to the position of the motor shaft may be eliminated in the middle of performing backlash correction, and the position of the driven shaft may pass over the position command. Even if the position of the driven shaft passes over the position related to the position command, when the backlash correction amount continues to be added to the position command for the motor, the driven shaft will move too much to the reverse direction according to the correction, and the driven shaft position may pass over the position command, and become excessive correction.

The present invention has an object of providing a motor control device, a motor control method, and a motor control program for preventing from becoming excessive correction upon adding a backlash correction amount to the position command for a motor.

According to a first aspect of the present invention, a first motor control device (e.g., the motor control device 10 described later) is motor control device for correcting backlash between a movable part (e.g., the motor shaft 30 described later) that is driven by a motor, and a driven part (e.g., the spindle 50 described later) that is driven by the movable part, the device including: a first position detection part (e.g., the first position detection part 101 described later) that detects a first position which is a position of the movable part; a second position detection part (e.g., the second position detection part 103 described later) that detects a second position which is a position of the driven part; a positional error calculation part (e.g., the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (e.g., the position command creation part 105 described later) that creates a position command; a reversal detection part (e.g., the reversal detection part 106 described later) that detects reversal of the position command; a positional error variation calculation part (e.g., the positional error variation calculation part 107 described later) that calculates a variation of the positional error since reversal being detected; a first determination part (e.g., the first determination part 108 described later) that determines whether variation of the positional error exceeds a predetermined first reference value, or a predetermined second reference value; a position deviation calculation part (e.g., the position deviation calculation part 109 described later) that calculates position deviation which is a difference between the position command and the second position detected value; a second determination part (e.g., the second determination part 110 described later) that determines whether the position deviation has become no more than a predetermined third reference value; and a backlash correction part (e.g., the backlash correction part 111 described later) that adds a backlash correction amount to the position command, in which the backlash correction part starts addition of the backlash correction amount when the variation of the positional error exceeds the first reference value, the backlash correction part ends the addition of the backlash correction amount when the variation of the positional error exceeds the second reference value, and the backlash correction part suspends the addition of the backlash correction amount when the position deviation becomes no more than the third reference value during correction.

According to a second aspect of the present invention, in the motor control device as described in the first aspect, the third reference value may be a position device of when starting correction.

According to a third aspect of the present invention, a second motor control device (e.g., the motor control device 10A described later) is motor control device for correcting backlash between a movable part (e.g., the motor shaft 30 described later) that is driven by a motor, and a driven part (e.g., the spindle 50 described later) that is driven by the movable part, the device including: a first position detection part (e.g., the first position detection part 101 described later) that detects a first position which is a position of the movable part; a second position detection part (e.g., the second position detection part 103 described later) that detects a second position which is a position of the driven part; a positional error calculation part (e.g., the positional error calculation part 104 described later) that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part; a position command creation part (e.g., the position command creation part 105 described later) that creates a position command; a reversal detection part (e.g., the reversal detection part 106 described later) that detects reversal of the position command; a positional error variation calculation part (e.g., the positional error variation calculation part 107 described later) that calculates a variation of the positional error since reversal being detected; a first determination part (e.g., the first determination part 108 described later) that determines whether variation of the positional error exceeds a predetermined first reference value, or a predetermined second reference value; a position deviation calculation part (e.g., the position deviation calculation part 109 described later) that calculates position deviation which is a difference between the position command and the second position detected value; a second determination part (e.g., the second determination part 110 described later) that determines whether the position deviation has become no more than a predetermined third reference value; and a backlash correction part (e.g., the backlash correction part 211 described later) that adds a backlash correction amount to the position command, in which the backlash correction part starts addition of the backlash correction amount when the variation of the positional error exceeds the first reference value, the backlash correction part ends the addition of the backlash correction amount when the variation of the positional error exceeds the second reference value, and the backlash correction part incrementally decreases a correction amount to be added when the position deviation becomes no more than the third reference value during correction.

According to a fourth aspect of the present invention, in the motor control device as described in the third aspect, the backlash correction part (e.g., the backlash correction part 311 described later) may include a reference positional error calculation part (e.g., the reference positional error calculation part 320 described later) that calculates a reference positional error which is a set point to which the positional error should reach after reversal, and a multiplier (e.g., the correction gain multiplier 322 described later) that sets a value arrived at by multiplying a correction gain set in advance by deviation between the reference positional error and the positional error as the backlash correction amount; and the backlash correction part may cause the correction gain to monotonically decrease accompanying time elapse if the position deviation is no more than the third reference value, and the backlash correction part may set the correction gain to zero if the position deviation reaches a position deviation of when starting correction.

According to a fifth aspect of the present invention, in the motor control device as described in any one of the first to fourth aspects, the movable part driven by the motor and the driven part driven by the movable part may be mechanically coupled by a combination of gears and a belt.

According to a sixth aspect of the present invention, a first motor control method is a method for controlling a motor that corrects for backlash between a movable part (e.g., the motor shaft 30 described later) that is driven by a motor and a driven part (e.g., the spindle 50 described later) that is driven by the movable part, the method including the steps executed by a computer of: detecting a first position which is a position of the movable part; detecting a second position which is a position of the driven part; calculating a positional error which is a deviation between a converted first position detected value arrived at by converting a detected value of the first position into a value of a position of the driven part according to a rotation ratio between the movable part and the driven part, and a detected value of the second position; creating a position command; detecting reversal of the position command; calculating variation of the positional error since reversal being detected; determining whether the variation of the positional error has exceeded a predetermined first reference value or a predetermined second reference value; calculating a position deviation which is a difference between the position command and a detected value of the second position; determining whether the position deviation has become no more than a predetermined third reference value; and adding a backlash correction amount to the position command, in which the method starts addition of the backlash correction amount is started when the variation of the positional error exceeds the first reference value, ends the addition of the backlash correction amount when the variation of the positional error exceeds the second reference value, and suspends the addition of the backlash correction amount when the position deviation becomes no more than the third reference value during correction.

According to a seventh aspect of the present invention, in the motor control method as described in the sixth aspect, the third reference value may be a position deviation of when starting correction.

According to an eighth aspect of the present invention, a second motor control method is a method for controlling a motor that corrects for backlash between a movable part (e.g., the motor shaft 30 described later) that is driven by a motor and a driven part (e.g., the spindle 50 described later) that is driven by the movable part, the method including the steps executed by a computer of: detecting a first position which is a position of the movable part; detecting a second position which is a position of the driven part; calculating a positional error which is a deviation between a converted first position detected value arrived at by converting a detected value of the first position into a value of a position of the driven part according to a rotation ratio between the movable part and the driven part, and a detected value of the second position; creating a position command; detecting reversal of the position command; calculating variation of the positional error since reversal being detected; determining whether the variation of the positional error has exceeded a predetermined first reference value or a predetermined second reference value; calculating a position deviation which is a difference between the position command and a detected value of the second position; determining whether the position deviation has become no more than a predetermined third reference value; and adding a backlash correction amount to the position command, in which the method starts addition of the backlash correction amount when the variation of the positional error exceeds the first reference value, ends the addition of the backlash correction amount when the variation of the positional error exceeds the second reference value, and incrementally decreases a correction amount to be added when the position deviation becomes no more than the third reference value during correction.

According to a ninth aspect of the present invention, in the motor control method as described in the eighth aspect, the step of adding the backlash correction amount to the position command may include a step of calculating a reference positional error which is a set point to which the positional error should reach after reversal, and a step of setting a value arrived at by multiplying a correction gain set in advance by deviation between the reference positional error and the positional error as the backlash correction amount; and the correction gain may be monotonically decreased accompanying time elapse if the position deviation becomes no more than the third reference value, and the correction gain is set to zero if the position deviation reaches u position deviation of when starting correction.

According to a tenth aspect of the present invention, a first motor control program is a motor control program for correcting backlash between a movable part (e.g., the motor shaft 30 described later) that is driven by a motor and a driven part (e.g., the spindle 50 described later) that is driven by the movable part, the program enabling a computer to execute the steps of: detecting a first position which is a position of the movable part; detecting a second position which is a position of the driven part; calculating a positional error which is a deviation between a converted first position detected value arrived at by converting a detected value of the first position into a value of a position of the driven part according to a rotation ratio between the movable part and the driven part, and a detected value of the second position; creating a position command; detecting reversal of the position command; calculating variation of the positional error since reversal being detected; determining whether the variation of the positional error has exceeded a predetermined first reference value or a predetermined second reference value; calculating a position deviation which is a difference between the position command and a detected value of the second position; determining whether the position deviation has become no more than a predetermined third reference value; and adding a backlash correction amount to the position command, in which the program starts addition of the backlash correction amount when the variation of the positional error exceeds the first reference value, ends the addition of the backlash correction amount when the variation of the positional error exceeds the second reference value, and suspends the addition of the backlash correction amount when the position deviation becomes no more than the third reference value during correction.

According to an eleventh aspect of the present invention, in the motor control program as described in the tenth aspect, the third reference value may be a position deviation of when starting correction.

According to a twelfth aspect of the present invention, a second motor control program is a motor control program for correcting backlash between a movable part (e.g., the motor shaft 30 described later) that is driven by a motor and a driven part (e.g., the spindle 50 described later) that is driven by the movable part, the program enabling a computer to execute the steps of: detecting a first position which is a position of the movable part; detecting a second position which is a position of the driven part; calculating a positional error which is a deviation between a converted first position detected value arrived at by converting a detected value of the first position into a value of a position of the driven part according to a rotation ratio between the movable part and the driven part, and a detected value of the second position; creating a position command; detecting reversal of the position command; calculating variation of the positional error since reversal being detected; determining whether the variation of the positional error has exceeded a predetermined first reference value or a predetermined second reference value; calculating a position deviation which is a difference between the position command and a detected value of the second position; determining whether the position deviation has become no more than a predetermined third reference value; and adding a backlash correction amount to the position command, in which the program starts addition of the backlash correction amount when the variation of the positional error exceeds the first reference value, ends the addition of the backlash correction amount when the variation of the positional error exceeds the second reference value, and incrementally decreases a correction amount to be added when the position deviation becomes no more than the third reference value during correction.

According to a thirteenth aspect of the present invention, in the motor control program as described in the twelfth aspect, the step of adding the backlash correction amount to the position command may include a step of calculating a reference positional error which is a set point to which the positional error should reach after reversal, and a step of setting a value arrived at by multiplying a correction gain set in advance by deviation between the reference positional error and the positional error as the backlash correction amount; and the correction gain is monotonically decreased accompanying time elapse if the position deviation becomes no more than the third reference value, and the correction gain is set to zero if the position deviation reaches a position deviation of when starting correction.

According to the present invention, it is possible to prevent from becoming excessive correction upon adding a feedback correction amount to a position command for a motor.

DETAILED DESCRIPTION OF THE INVENTION

Hereinafter, embodiments of the present invention will be explained using FIGS. 2 to 9.

Figure 6A:
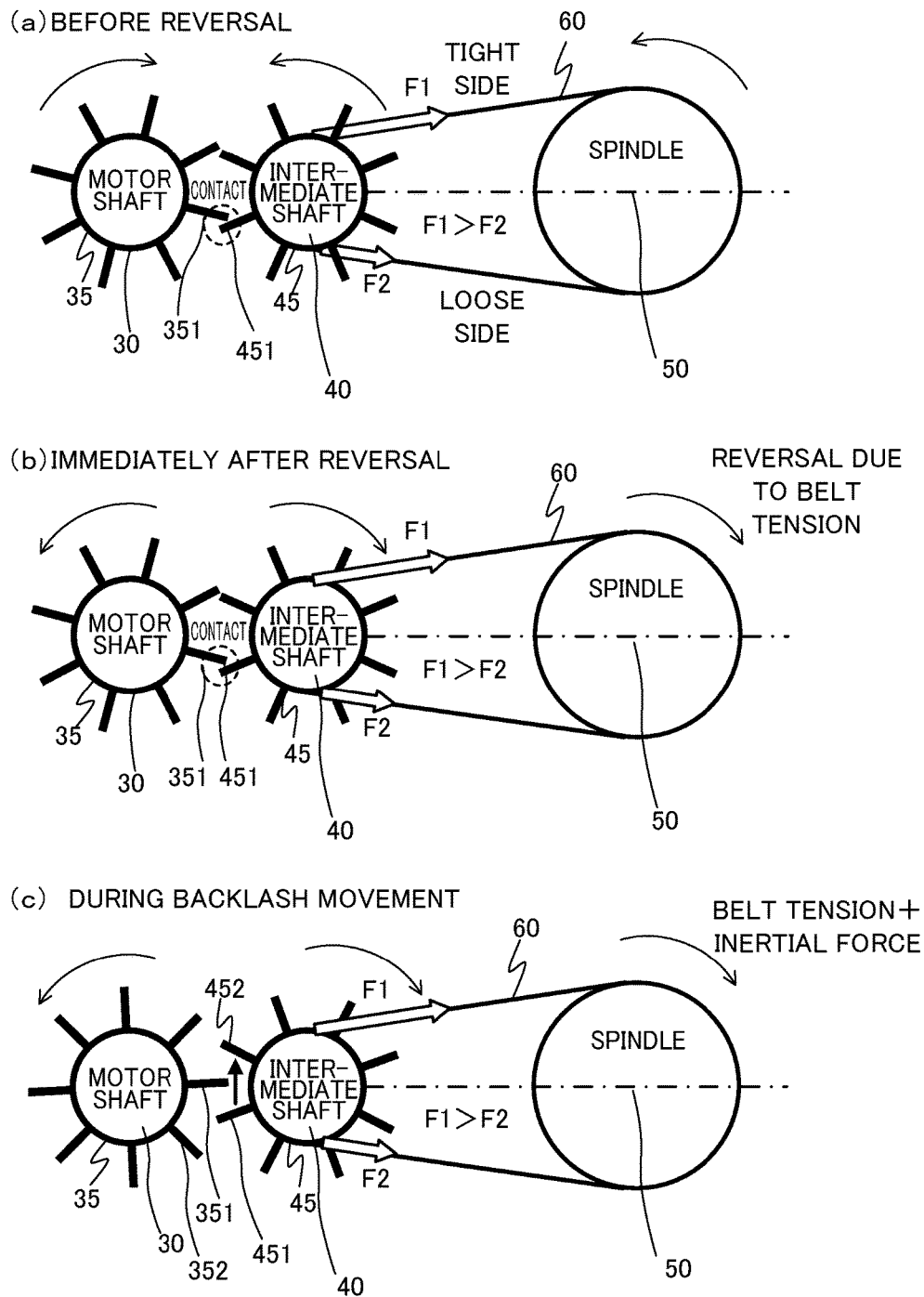
FIG. 6A is an explanatory view for the behavior of each shaft during reversal of the motor.
Figure 6B:
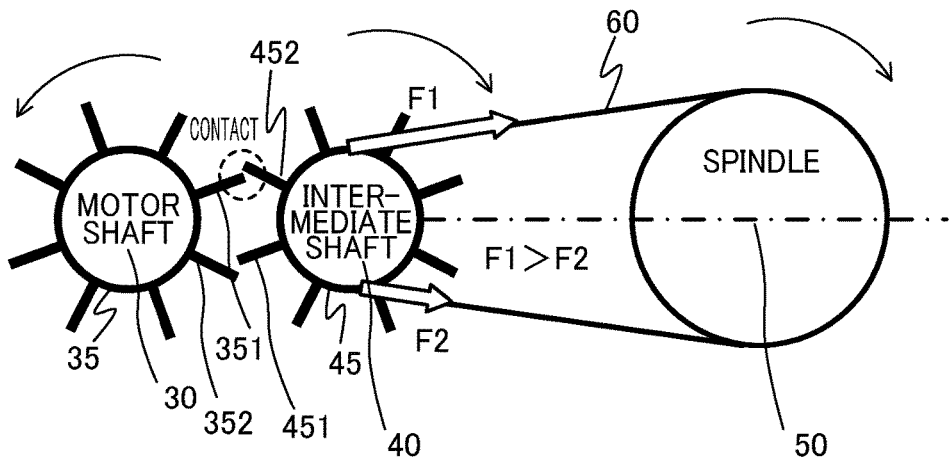
FIG. 6B is an explanatory view for the behavior of each shaft during reversal of the motor.
Figure 6B:
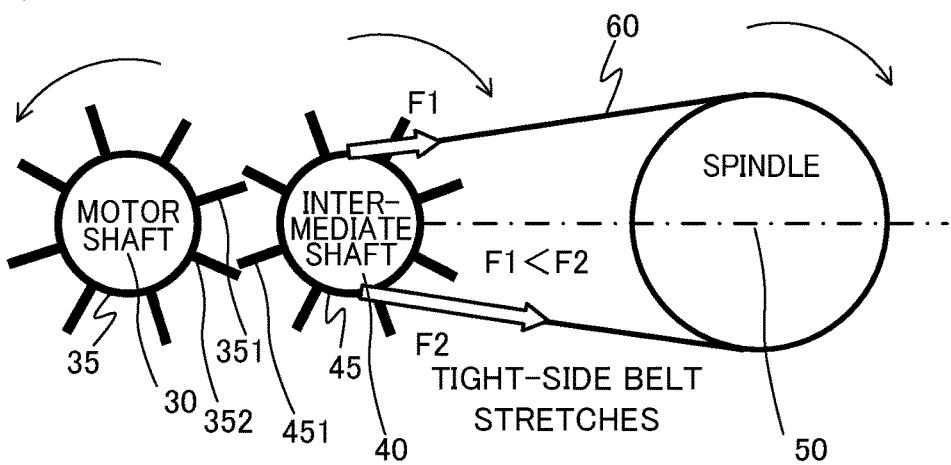

FIG. 6A and FIG. 6B are views showing the behaviors of each shaft during reversal of a motor, in a case of using a conventional feedback correction method. More specifically, they are views illustrating the behaviors of each shaft during reversal of the motor, when a reduction mechanism between the motor and driven shaft (spindle) is configured by gears and a belt.

As shown in FIG. 6A, a motor shaft gear 35 is fixed to the motor shaft 30 which serves as a movable part. An intermediate shaft gear 45 is fixed to an intermediate shaft 40 which is provided separately from the motor shaft 30. In addition, by teeth 351 of the motor shaft gear 35 and teeth 451 of the intermediate shaft gear 45 meshing, in the case of the motor shaft 30 rotating in the clockwise direction, the intermediate shaft 40 will rotate in the counter-clockwise direction, while in the case of the motor shaft 30 rotating in the counter-clockwise direction, the intermediate shaft 40 will rotate the clockwise direction. Furthermore, an endless belt 60 having elasticity is bridged between a portion of the intermediate shaft 40 at which the intermediate shaft gear 45 is not provided and the spindle 50 serving as a driven part.

In a case of the intermediate shaft 40 rotating in the clockwise direction, the spindle 50 will thereby rotate in the clockwise direction accompanying this, while in the case of the intermediate shaft 40 rotating in the counter-clockwise direction, the spindle 50 will rotate in the counter-clockwise direction accompanying this. The rotation of the motor shaft 30, intermediate shaft 40 and spindle 50 are thereby linked.

More specifically, in the case of the motor shaft 30 rotating in the clockwise direction, the spindle 50 will rotate in the counter-clockwise direction, while in the case of the motor shaft 30 rotating in the counter-clockwise direction, the spindle 50 will rotate in the clockwise direction. In other words, the motor shaft 30 driven by the motor 20, and the spindle 50 driven by the motor shaft 30 are mechanically coupled by the combination of the gears 35, 45 and the belt 60.

FIG. 6A (a) shows an aspect of the positions of the motor shaft gear 35 and intermediate shaft gear 45 prior to reversal of the motor 20, and the tension acting on the belt 60. Herein, a case of the motor shaft 30 rotating in the clockwise direction is assumed. It should be noted that the embodiments of the present invention are not to be limited thereto.

As mentioned above, the motor shaft gear 35 and intermediate shaft gear 45 mesh, and the tooth 351 of the motor shaft gear 35 and the tooth 451 of the intermediate shaft gear 45 shown in FIG. 6A (a) contact. Since the motor shaft 30 rotates in the clockwise direction, it forms a state in which the tooth 351 is pressing the tooth 451 downwards. Accompanying this, the intermediate shaft gear 45, and consequently the intermediate shaft 40, rotate in the counter-clockwise direction. It should be noted that, upon making explanations shared for a plurality of teeth 351 of the motor shaft gear 35, it will be made to express as "teeth 351" representatively.

Since the endless belt 60 is bridged between the intermediate shaft 40 and spindle 50, the spindle 50 will similarly rotate in the counter-clockwise direction, accompanying rotation in the counter-clockwise direction of the intermediate shaft 40. The belt 60 has two un-wound portions so as to follow two tangent lines extending from the outer circumferences of both shafts, between the intermediate shaft 40 and spindle 50. The un-wound portion on the upper side in FIG. 6A (a) draws the spindle 50 in the counter-clockwise direction, whereby the spindle 50 rotates counter-clockwise. In other words, an upper side un-wound portion is a "tight side", and a lower side un-wound portion is a "loose side". Herein, in the case of defining the tension on the upper side un-wound portion as F1, and the tension on the lower side un-wound portion as F2, then F1 will be greater than F2.

Next, FIG. 6A (b) shows an aspect of the positions of the motor shaft gear 35 and intermediate shaft gear 45, and the tension acting on the belt 60, immediately after the motor starts reversing in the counter-clockwise direction.

Accompanying the reversing of the motor shaft 30 to the counter-clockwise direction, since the motor shaft gear 35 will also rotate in the counter-clockwise direction, the tooth 351 of the motor shaft gear 35 will no longer press the tooth 451 of the intermediate shaft gear 45 downwards, and will start to move upwards. On the other hand, in the belt 60 bridged to the intermediate shaft 40, due to the tension F1 of the upper side un-wound portion becoming greater than the tension F2 of the lower side un-wound portion in FIG. 6A (a), as mentioned above, the intermediate shaft 40 starts to rotate in the clockwise direction. Accompanying this, the spindle 50 also starts rotation in the clockwise direction. Upon doing so, the tooth 451 of the intermediate shaft gear 45 is not pressed against the tooth 351 of the motor shaft gear 35. In addition, accompanying rotation of the intermediate shaft gear 45 in the clockwise direction, the tooth 451 of the intermediate shaft gear 45 continues contact with the tooth 351 of the motor shaft gear 35, due to moving upwards in FIG. 1. In other words, at this stage, a gap between the teeth 351 of the motor shaft gear 35 and the teeth 451 of the intermediate shaft gear 45, i.e. backlash, still has not occurred.

As mentioned above, the intermediate shaft 40 and spindle 50 will rotate in the clockwise direction, due to the tension F1 on the upper side un-wound portion of the belt 60 being greater than the tension F2 on the lower side un-wound portion. Then, accompanying continuing rotation to the clockwise direction, the difference between the two tensions F1 and F2 becomes smaller. In other words, the tight-side tension of the belt 60 loosens, and the force by which the intermediate shaft 40 reverses weakens. Upon the speed command to the motor shaft 30 exceeding the reverse speed of the intermediate shaft 40, the tooth 351 of the motor shaft. gear 35 starts to move within the backlash between the tooth 451 and tooth 452 of the intermediate shaft gear 45, as shown in FIG. 6A (c). At this timing, the backlash correction amount is added to the position command for the motor shaft 30. The spindle 50 which is the driven shaft continues rotation due to the tension of the belt 60 and inertial force; however, if this rotation amount is great, delay in the position of the spindle 50 which is the driven shaft relative to the position command for the motor 20 will become relatively small. Furthermore, since the extent to which the movement of the spindle which is the driven part is linked to the movement of the motor shaft 30 is high, irrespective of the tooth 351 of the motor shaft gear 35 moving within the backlash, the variation in the positional error which is the difference between the position of the motor shaft 30 and the position of the spindle 50 which is the driven shaft will not become so large.

Before long, the tooth 351 of the motor shaft. gear 35 ends movement within the backlash, and contacts with the tooth 452 of the intermediate shaft gear 45, as shown in FIG. 6B (d). As mentioned above, when the rotation amount of the spindle 50 which is the driven shaft is great while the tooth 351 is moving within the backlash, the variation in the positional error will not reach a value serving as the end condition of backlash correction; therefore, the backlash correction amount continues to be added to the position command for the motor 20. However, the tooth 351 of the motor shaft gear 35 is already contacting with the tooth 452 of the intermediate shaft gear 45, as well as the position deviation of the driven shaft, which is the deviation between the position command and the position of the spindle 50 which is the driven shaft, decreasing; therefore, when the backlash correction amount continues to be added, the position of the spindle 50 will pass by the position command, and become excessive correction.

In addition, immediately after the tooth 351 of the motor shaft gear 35 contacts with the tooth 452 of the intermediate shaft gear 45, among the two un-wound portions of the belt 60, the un-wound portion on the upper side becomes the "tension side", and the un-wound portion on the lower side becomes the "loose side", as shown in FIG. 6B (d). In other words, when defining the tension of the upper side un-wound portion as F1, and the tension of the lower side un-wound portion as F2, it becomes F1>F2. By this tension F1 of the upper side un-wound portion being larger than the tension F2 of the lower side un-wound portion, the belt 60 elastically deforms, as well as the spindle 50 which is the driven shaft no longer following rotation of the intermediate shaft 40. After contact between the tooth 351 and the tooth 452, the position of the spindle 50 which is the driven shaft thereby starts to delay compared to the position of the motor shaft 30.

Before long, at the stage at which the tension F2 of the lower side un-wound portion becomes sufficiently large compared to the tension F1 of the upper side un-wound portion, the spindle 50 begins rotation in a state in which the position of the spindle 50 which is the driven shaft is not delayed relative to the position of the motor shaft 30.

Figure 7A:
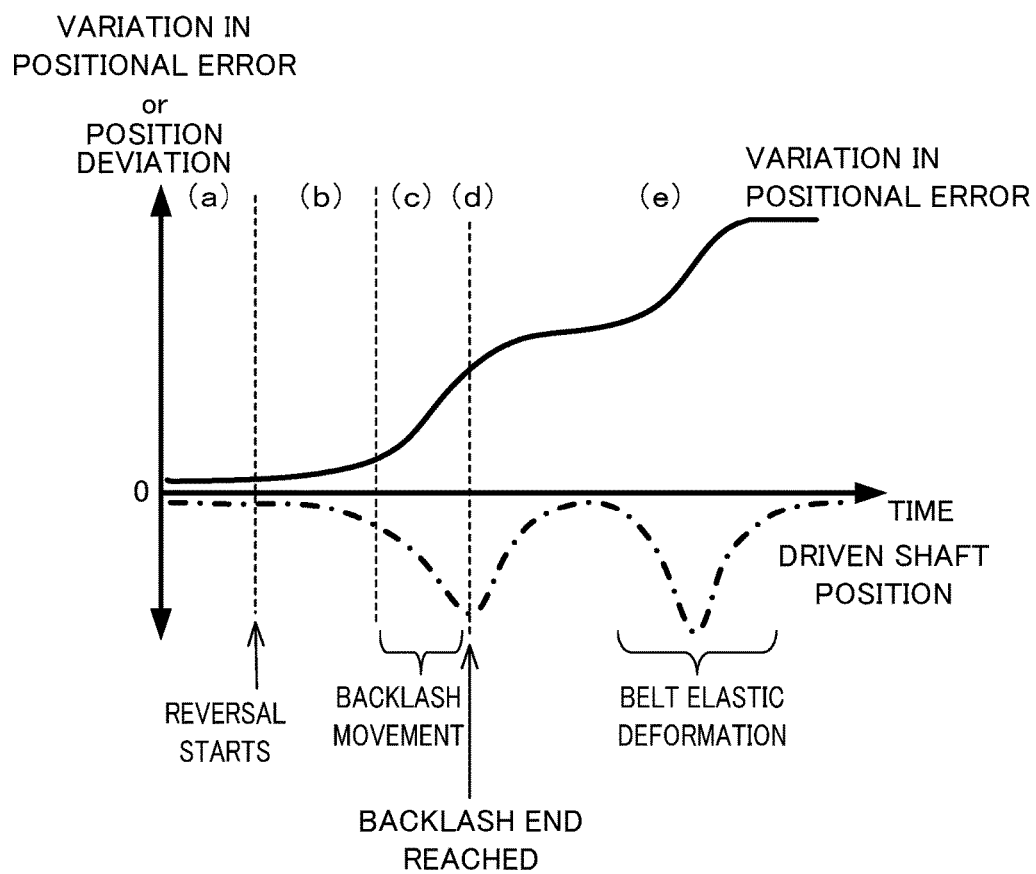
FIG. 7A is a graph showing the time courses of variation in positional error, and position deviation of a driven shaft, in a case of not performing feedback correction.
Figure 7B:
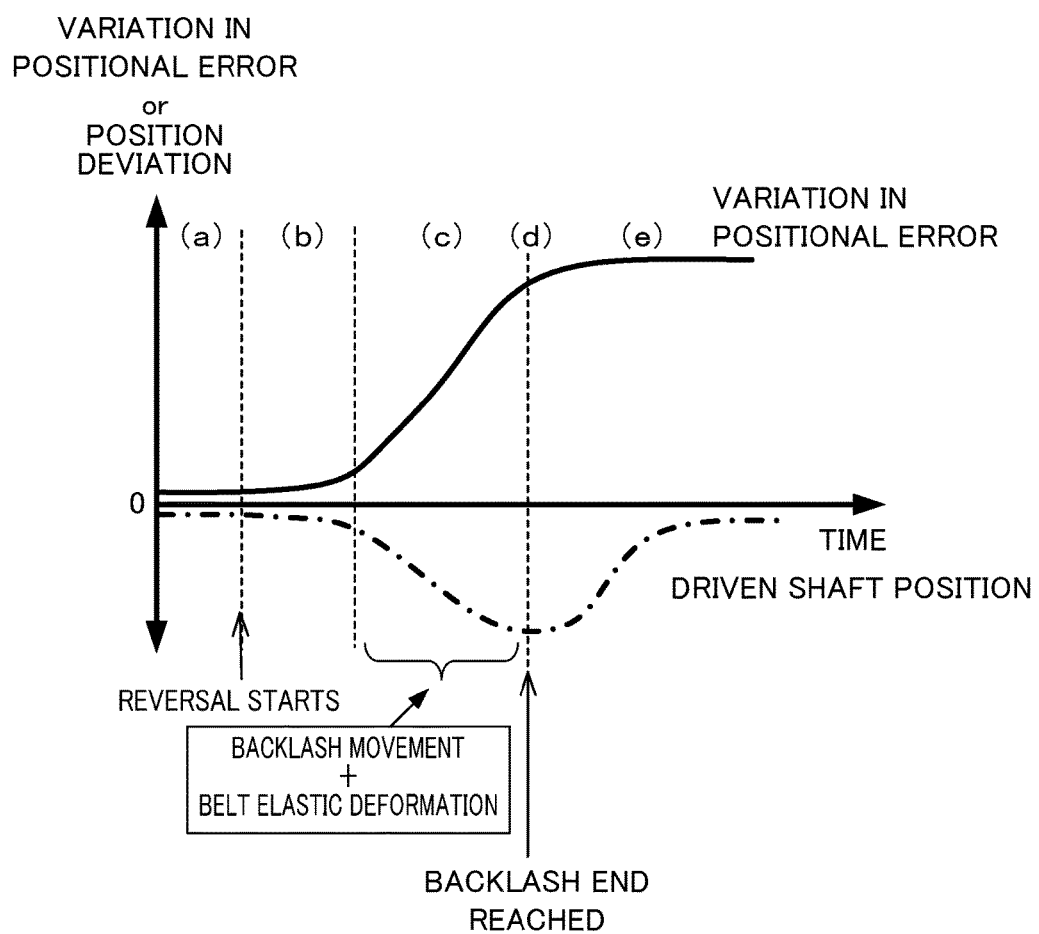
FIG. 7B is a graph showing the time courses of variation in positional error, and position deviation of a driven shaft, in a case of not performing feedback correction.
Figure 8A:
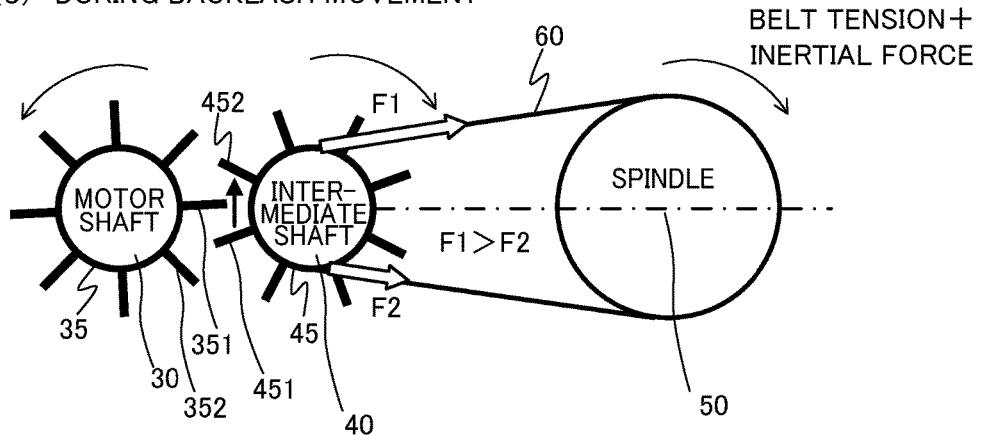
FIG. 8A is an explanatory view for the behavior of each shaft during reserving of the motor, in a case of not performing feedback correction.
Figure 8A:
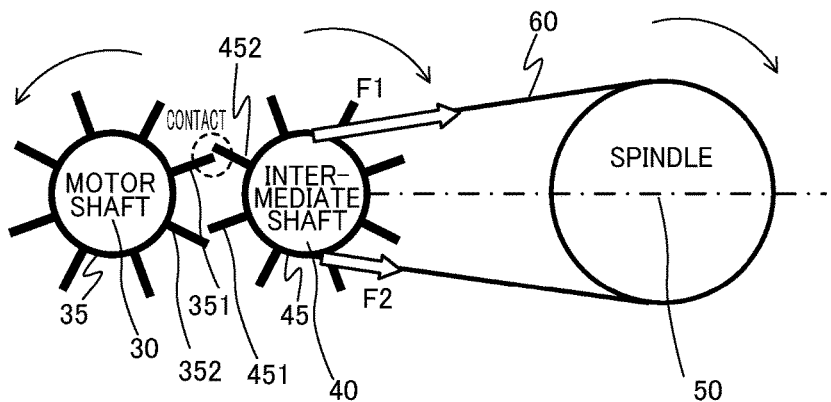
Figure 8B:
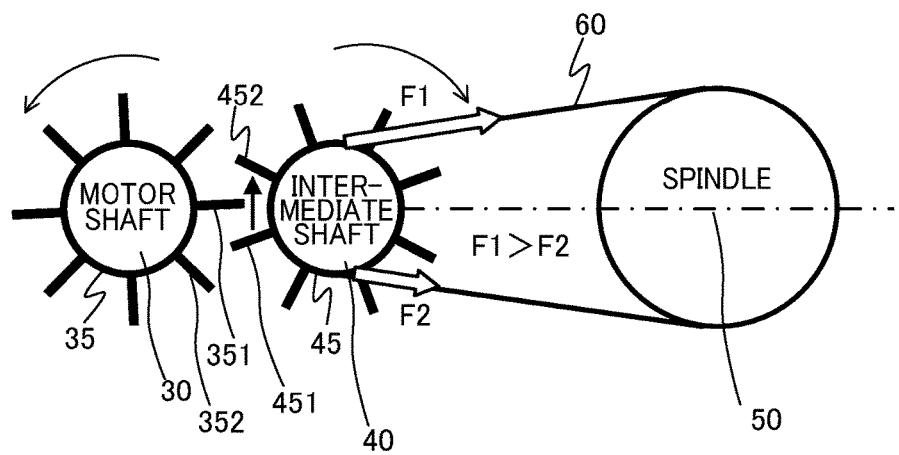
FIG. 8B is an explanatory view for the behavior of each shaft during reserving of the motor, in a case of not performing feedback correction.
Figure 8B:
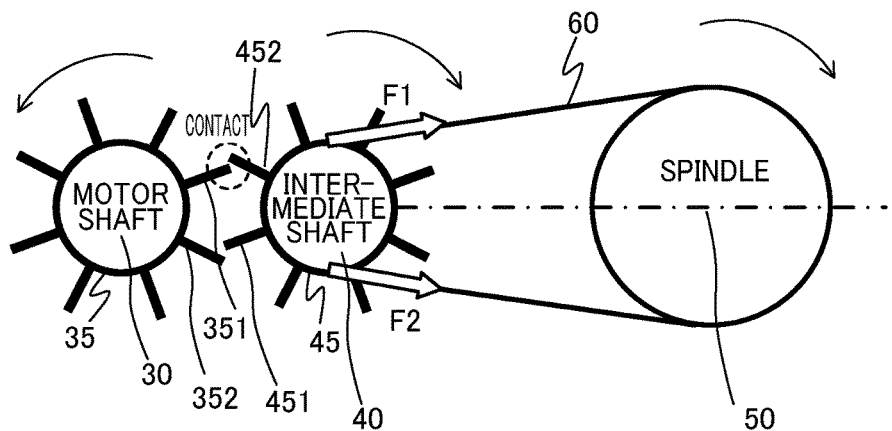
Figure 9:
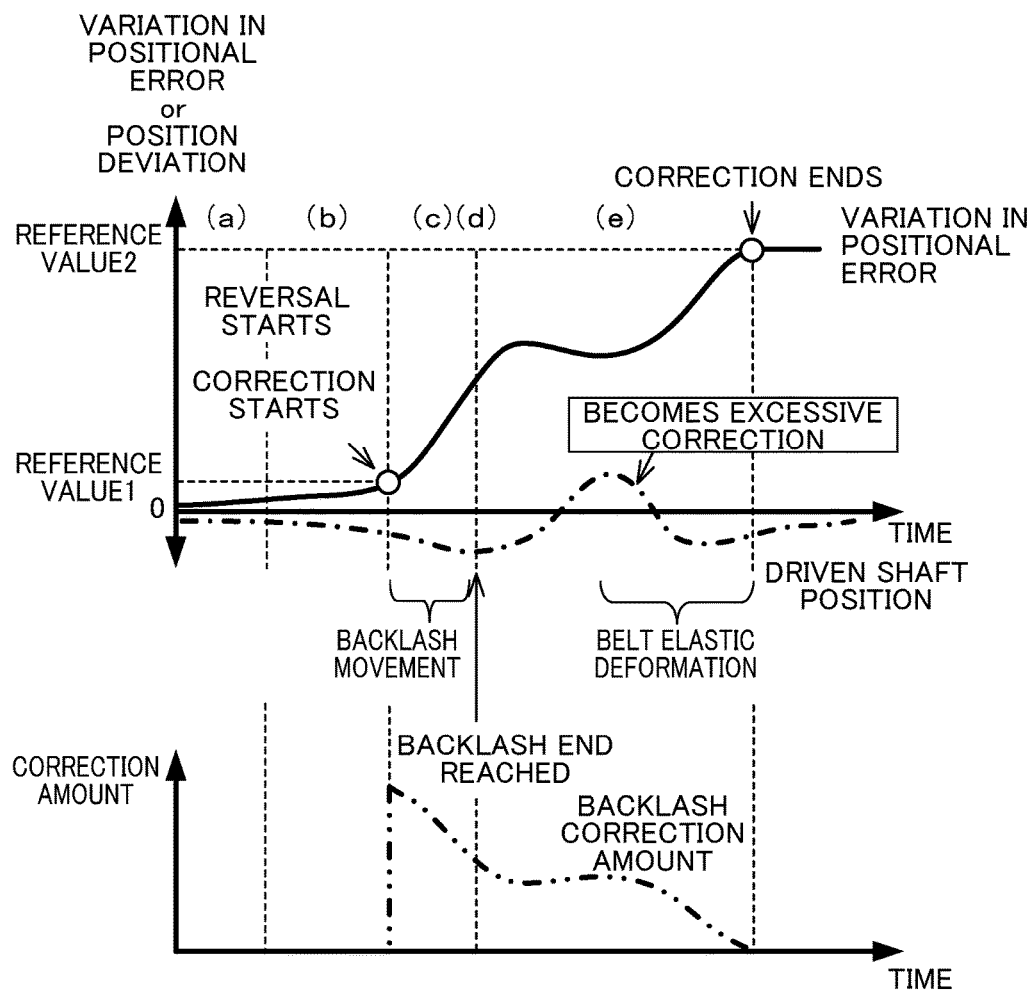
FIG. 9 provides graphs showing the time courses of variation of positional error, position deviation of the driven shaft, and feedback correction amount in a case of performing feedback correction.

FIG. 7A and FIG. 7B are graphs showing the time courses of the variation in positional error which is error between the position of the motor shaft 30 and position of the spindle 50, and position deviation of the driven shaft which is deviation between the position command for the motor 20 and the position of the spindle 50, in a case of not performing backlash correction. In addition, FIG. 8A and FIG. 8B are views showing the behaviors of each shaft during reversal of the motor, in the case of not performing backlash correction. The behavior of each shaft shown in FIG. 8A (c) is behavior in the region of time (c) in FIG. 7A, and the behavior of each shaft shown in FIG. 8A (d) is behavior at the moment of time (d) in FIG. 7A. Similarly, the behavior of each shaft shown in FIG. 8B (c) is behavior in the region of time (c) in FIG. 7B, and the behavior of each shaft shown in FIG. 8B (d) is behavior at the moment of time (d) in FIG. 7B. In addition, FIG. 9 is a graph showing the time courses of variation in positional error and the position deviation of the driven shaft, in a case of the backlash correction becoming excessive correction. It should be noted that the variation in positional error is shown by the solid line, the position deviation of the driven shaft is shown by the one-dot chain line, and the backlash correction amount is shown by the two-dot chain line.

First, the time courses of the variation in positional error and position deviation of the driven shaft in the case of not performing backlash correction will be explained using FIGS. 7A and 8A. It should be noted that, in the following explanation, each constituent element shown in FIGS. 6A and 6B and the reference symbol thereof will be appropriated as suitable.

In the graph, while the time is in the region of (a), the motor shaft 30 is at a stage prior to reversing. In this region, similarly to FIG. 6A (a), the motor shaft 30 driven by the motor 20 and the spindle 50 driven by the motor shaft 30 are mechanically coupled by the combination of the gears 35, 45 and the belt 60; therefore, the rotation of the motor shaft 30 and the rotation of the spindle 50 are somewhat linked. Therefore, both the positional error and the position deviation of the drive shaft do not greatly change in particular.

Before long, at the same time as when the time enters the region of (b), the motor shaft 30 reverses; however, in the case of the motor shaft 30 trying to reverse in the counter-clockwise direction, the intermediate shaft 40 starts to rotate in the clockwise direction due to the tension of the upper side un-wound portion becoming larger than the tension of the lower side un-wound portion in the belt 60 bridged to the intermediate shaft 40. Accompanying this, the spindle 50 also starts rotation in the clockwise direction. For this reason, the tooth 351 of the motor shaft gear 35 and the tooth 451 of the intermediate shaft gear 45 continue contact, and backlash does not occur.

Subsequently, when the time enters the region of (c), the tight-side tension of the belt 60 loosens, and the force by which the intermediate shaft 40 reverses weakens. By the speed command for the motor shaft 30 exceeding the reverse speed of the intermediate shaft 40, a gap generates between the tooth 351 of the motor shaft gear 35 and the tooth 451 of the intermediate shaft gear 45, and the tooth 351 of the motor shaft gear 35 moves within the backlash. In addition, as mentioned above, the rotation speed of the motor shaft 30 is faster than the rotation speed of the intermediate shaft 40, and thus the spindle 50; therefore, the positional error increases. Similarly, the delay in the position of the spindle 50 compared to the position command for the motor 20 also increases; therefore, the position deviation of the driven shaft increases as well.

When the tooth 351 of the motor shaft gear 35 moves within the backlash, the intermediate shaft 40 and spindle 50 do not stop, and continue rotating a certain amount due to belt tension and inertia, as shown in FIG. 8A (c). The rotation amount of the spindle 50 may increase depending on the operating conditions, and the spindle 50 may follow the position command to a certain extent. At this time, the variation of the positional error becomes small, as well as the increase amount in the position deviation becomes relatively small. Furthermore, since the spindle 50 also rotates accompanying the rotation of the intermediate shaft 40, the tight-side tension of the belt prior to reversal is not relieved either. In other words, the margin of the belt elastic deformation remains largely. In such a case, at the moment of time (d), as shown in FIG. 8A (d), after the tooth 351 of the motor shaft gear 35 reaches the tooth 452 of the intermediate shaft gear 45 which is the backlash end, the positional error increases due to the rotation delay of the spindle 50 from belt elastic deformation.

On the other hand, for other operating conditions, the time courses of the variation in positional error and the position deviation of the driven shaft are shown in FIG. 7B, and the behavior of each shaft during motor reversal is shown in FIG. 8B. For other operating conditions, the spindle 50 when the tooth 351 of the motor shaft gear 35 is moving within the backlash may somewhat stop, as shown in FIG. 8B (c). At this time, in addition to movement within the backlash, the belt 60 elastically deforms as shown in the graph while the time is in the region of (c) in FIG. 7B. The variation in the positional error during movement within the backlash thereby increases. In addition, the delay of the spindle relative to the position command also increases, and the increase amount of the position deviation becomes relatively large. Furthermore, whereas the intermediate shaft 40 rotates, since the spindle 50 is stopped, the tight-side tension of the belt prior to reversal is relieved. In such a case, at the moment of the time in FIG. 7B being (d), after the motor shaft gear 35 reaches the tooth 452 of the intermediate shaft gear 45 which is the backlash end, the rotation delay of the spindle 50 due to belt elastic deformation becomes small.

Returning back to FIG. 7A, at the moment of the time being (d), when the tooth 351 of the motor shaft gear 45 contacts with the tooth 452 next to the tooth 451 of the intermediate shaft gear 45, the position deviation of the driven shaft is reducing, and becomes almost the same value as the initial position deviation of the driven shaft.

When the time enters the region of (e), initially, accompanying the belt 60 elastically deforming, as well as the rotation speed of the spindle 50 being delayed, the position deviation of the driven shaft increases again. Subsequently, accompanying the elastic deformation of the belt 60 being eliminated, and the delay in position of the spindle 50 relative to the position command for the motor 20 reducing, the position deviation of the driven shaft decreases again.

FIG. 9 is a graph showing the time courses of the variation in positional error, position deviation of the driven shaft, and the backlash correction amount, in a case of the backlash correction becoming excessive correction.

When the time is in the regions of (a) and (b), the time courses of the variation in positional error and the position deviation of the driven shaft are basically identical to the graphs shown in FIGS. 7A and 7B. Before long, the time enters region (c), backlash occurs, and backlash correction is started. When comparing the parts in which performing backlash correction between the graphs of FIGS. 7A and 7B, the slope in the graph for position deviation of the driven shaft becomes gentle.

At time (d), at the moment when the tooth 351 of the motor shaft gear 35 contacts with the tooth 452 of the intermediate shaft gear 45, which is the end of backlash, the backlash disappears, and the position deviation of the driven shaft reaches a maximum. Subsequently, the time enters the region (e), and even if the position deviation of the driven shaft becomes zero, since the backlash correction is continued, the position of the spindle 50 passes by the position command. In other words, the sign of the position deviation of the driven shaft inverts, and becomes excessive correction.

Subsequently, as explained by referencing FIG. 6B, by the belt 60 elastically deforming, the spindle 50 does not follow the rotation of the intermediate shaft 40, and the position of the spindle 50 starts to be delayed compared to the position of the motor shaft 30. Moreover, due to the position of the spindle 50 being delayed more than the position command relative to the motor 20, the position deviation of the driven shaft increases again. Before long, the spindle 50 starts rotation without being delayed relative to the position command for the motor 20, and the position deviation of the driven shaft decreases again.

Therefore, for preventing the above-mentioned such excessive correction, the matter of monitoring the driven shaft position during backlash correction, and then suspending correction or weakening correction if the position deviation of the driven shaft becomes less than the reference value, and restarting correction if the position deviation of the driven shaft exceeds the reference value again is the concept serving as the foundation of the present invention.

First Embodiment

Figure 1:
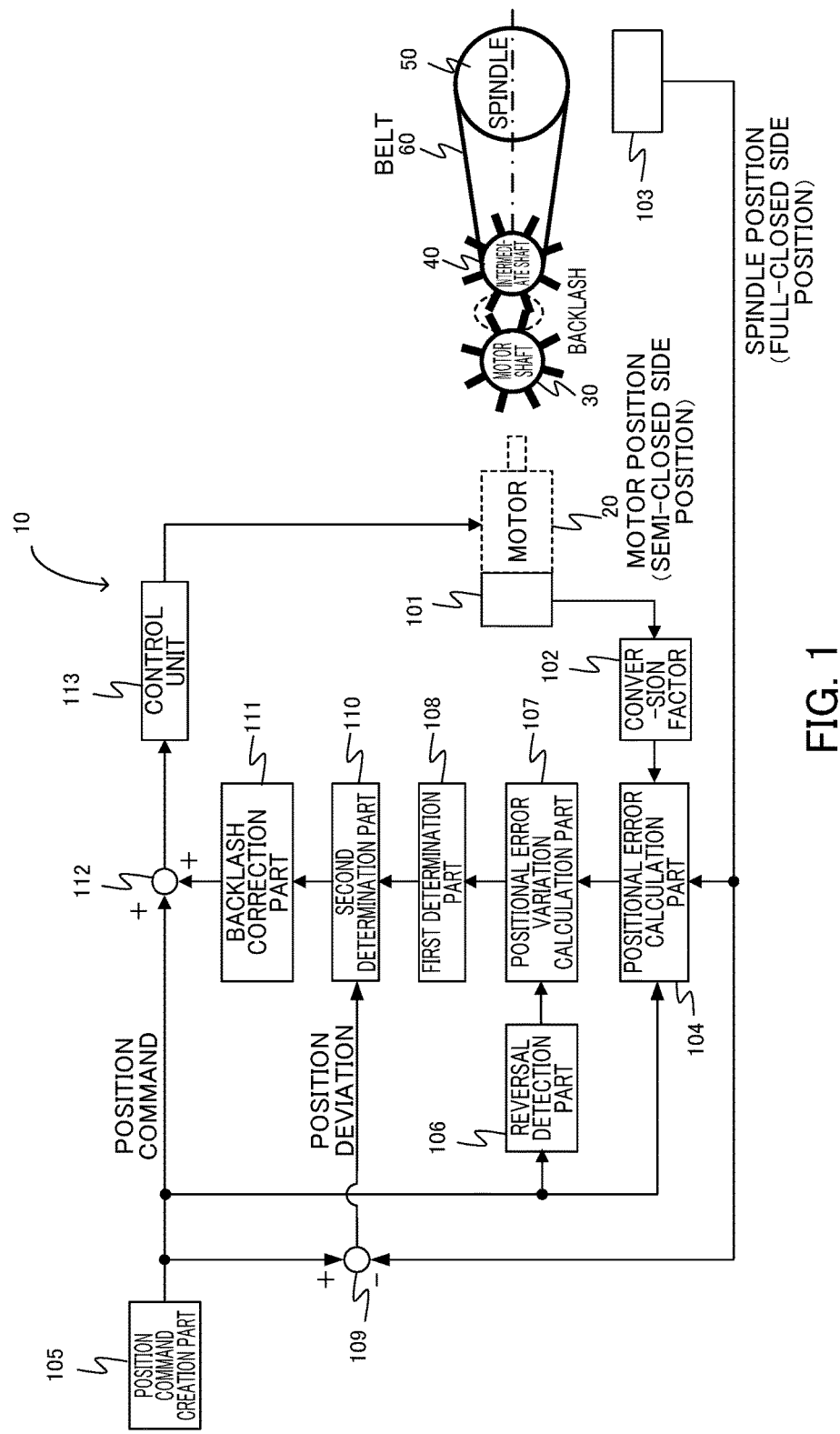
FIG. 1 is a diagram showing the configuration of a motor control device according to a first embodiment of the present invention.

FIG. 1 is a diagram showing the configuration of a motor control device 10 according to a first embodiment.

The motor control device 10 mainly includes: a first position detection part 101 such as an encoder that detects the position of the motor shaft 30 (referred to as "first position" or "motor position") serving as the movable part driven by the motor 20; a second position detection part 103 that detects the position of the spindle 50 (referred to as "second position" or "spindle position"), which is the driven part being driven by the above-mentioned movable part (motor shaft 30); and a positional error calculation part 104 that calculates "positional error", which is the deviation between the aforementioned first position and second position. It should be noted that the above-mentioned "first position" or "motor position" is a position acquired using a semi-closed loop, and the "second position" or "spindle position" is a position acquired using a full-closed loop.

Furthermore, the motor control device 10 includes a position command creation part 105, reversal detection part 106, positional error variation calculation part 107, first determination part 108, position deviation calculation part 109, second determination part 110, backlash correction part 111, and adder 112. The position command creation part 105 creates a position command for the above-mentioned motor 20. The reversal detection part 106 detects reversal of the above-mentioned position command. The positional error variation calculation part 107 calculates the variation in the above-mentioned positional error after reversal is detected.

The first determination part 108 determines whether the variation in the above-mentioned positional error has exceeded a predetermined first reference value or a predetermined second reference value. The position deviation calculation part 109 calculates position deviation which is deviation between the position command and the second position detection value. The second determination part 110 determines whether the position deviation is no more than a predetermined third reference value. The backlash correction part 111 calculates a backlash correction amount, in a case of the variation in the above-mentioned positional error exceeding the first reference value and being no more than the second reference value, then using the adder 112, adds this backlash correction amount to the above-mentioned position command. In addition, the backlash correction part 111, in the case of the variation in the above-mentioned positional error exceeding the second reference value, ends the addition of the backlash correction amount to the above-mentioned position command. Furthermore, the backlash correction part 111 suspends addition of the backlash correction amount to the above-mentioned position command, in a case of the above-mentioned position deviation becoming no more than the third reference value during correction. The position command to which the above-mentioned backlash correction amount was added is sent to the motor 20 by the control unit 113.

It should be noted that the above-mentioned positional error calculation part 104 calculates the deviation between the above-mentioned first position and second position as the positional error. More specifically, by multiplying a conversion factor 102 by the above-mentioned first position detected value, a converted first position detected value arrived at by converting to the value of the position of the driven part (spindle position) is calculated, and the deviation between this converted first position detected value and the second position detected value is calculated as the positional error. As this conversion factor 102, for example, it is possible to use the rotation ratio between the movable part (motor shaft 30) and the driven part (spindle 50).

In addition, the above-mentioned backlash correction amount can be calculated according to a known method, using either or both of the above-mentioned first position and second position, for example, a relative position relationship between the first position and second position, or the above-mentioned positional error.

Figure 2:
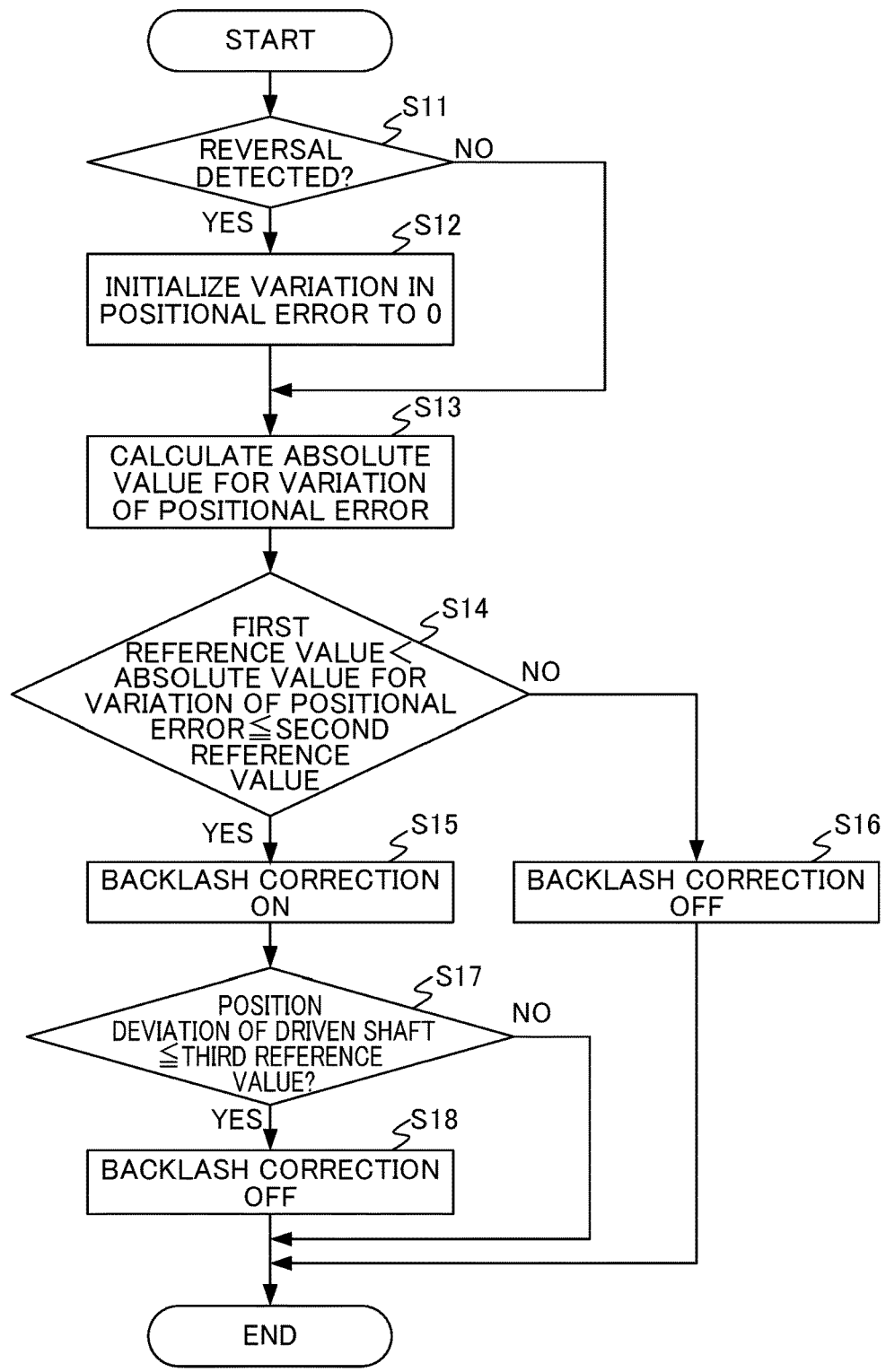
FIG. 2 is a flowchart showing processing of the motor control device according to the first embodiment of the present invention.

Next, although partially repeated, the operation flow of the above-mentioned motor control device 10 will be explained using FIG. 2.

First, the reversal detection part 106 monitors reversal of the position command created by the position command creation part 105 (Step S11). In the case of reversal being detected (S11: YES), the positional error variation calculation part 107 initializes the variation of positional error to 0 (Step S12). Then, the positional error variation calculation part 107 calculates the absolute value for variation of the positional error (Step S13). On the other hand, in the case of reversal of the position command not being detected (Step S11: NO), rather than passing through the step of initialization of Step S12 again, the positional error variation calculation part 107 calculates the absolute value for the variation of the positional error.

Next, the first determination part 108 compares the absolute value of the variation of the above-mentioned positional error with the predetermined first reference value and predetermined second reference value (Step S14). In the case of this absolute value exceeding the first reference value and being no more than the second reference value (Step S14: YES), the backlash correction part 111 adds the backlash correction amount to the position command. In other words, the backlash correction is turned ON (Step S15). In the case of the above-mentioned absolute value being no more than the first reference value, and the case of exceeding the second reference value (Step S14: NO), the backlash correction part 111 does not add the backlash correction amount to the position command. In other words, the backlash correction is turned OFF (Step S16).

Next, the second determination part 110 compares the above-mentioned position deviation with the predetermined third reference value (Step S17). In the case of this position deviation being no more than the third reference value (Step S17: YES), the backlash correction part 111 suspends addition of the backlash correction amount to the position command (Step S18). In the case of this position deviation exceeding the third reference value (Step S17: NO), suspension of the addition of the backlash correction amount is not conducted.

Figure 10:
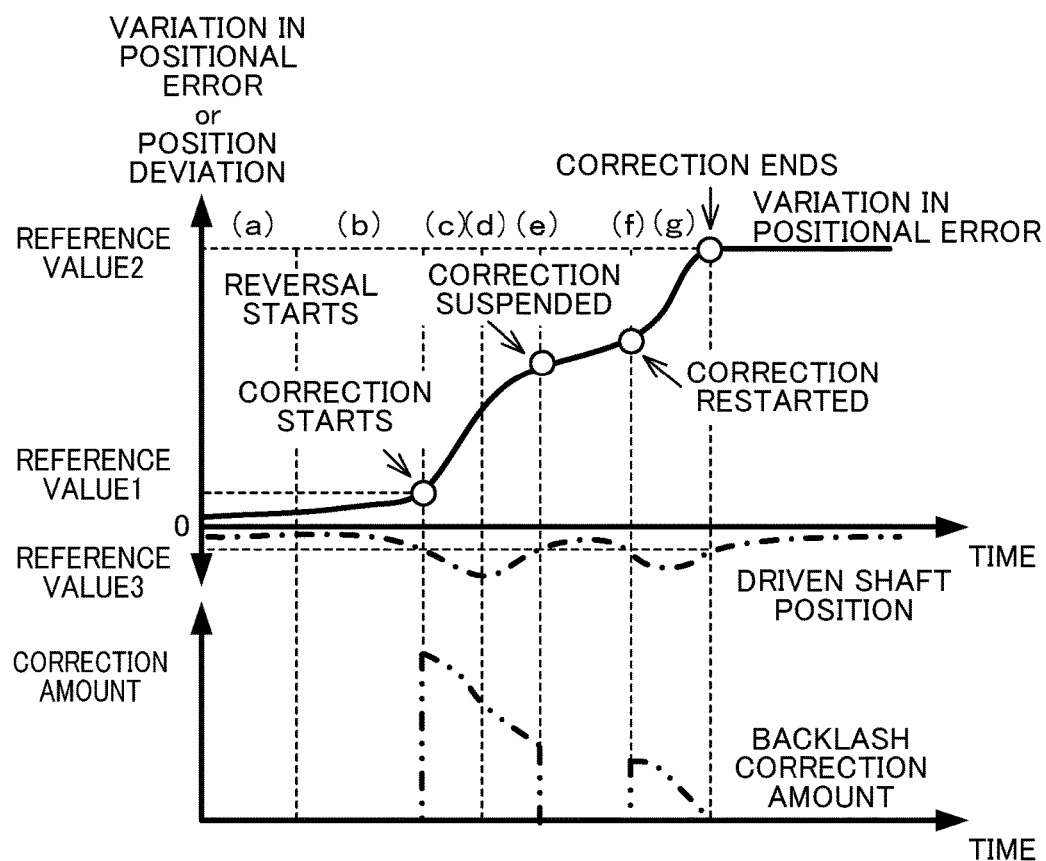
FIG. 10 provides graphs showing the time courses of variation of positional error, position deviation of the driven shaft, and feedback correction amount in a case of interrupting correction during feedback correction.

FIG. 10 provides graphs showing the time courses of the variation in positional error, position deviation of the driven shaft, and backlash correction amount, in the case of controlling backlash correction using the motor control device 10 according to the first embodiment. It should be noted that the variation in the positional error is shown by the solid line, the position deviation of the driven shaft is shown by the one-dot chain line, and the backlash correction amount is shown by the two-dot chain line.

The time courses of the variation in positional error and position deviation of the driven shaft while the time enters the regions of (a) and (b) are basically identical with the graphs of FIGS. 7A, 7B and 9. Before long, the time enters region (c), and backlash occurs, as well as starting backlash correction.

At time (d), the tooth of the motor shaft gear reaches the backlash end, and the position deviation of the driven shaft becomes a maximum. Subsequently, the position deviation of the driven shaft shifts to decline; however, at time (e), the second determination part 110 determines that the position deviation of the driven shaft is no more than reference value 3. In other words, the second determination part 110 determines that the position of the spindle 50 which is the driven shaft, and the position related to the position command for the motor 20 are distances of no more than the reference value 3. Based on this, the second determination part 110 instructs suspension of the backlash correction to the backlash correction part 111. Accompanying this, the backlash correction amount becomes zero.

Accompanying the suspension in backlash correction, the amount of the position deviation of the driven shaft rises again. Before long, at time (f), the position deviation of the driven shaft exceeds the reference value 3. Based on this, the second determination part 110 instructs restarting of backlash correction to the backlash correction part 111.

The sign of the position deviation of the driven shaft is no longer inverted by the motor control device 10 according to the first embodiment, and it becomes possible to prevent the backlash correction from becoming excessive correction.

Furthermore, as mentioned by referencing FIGS. 7A and 7B, the backlash arrival timing relative to the variation in positional error may differ according to the operating conditions, even if the same machine. Even in such a case, the backlash correction amount continues to be added from reversal until the place at which the positional error changed (or example, correction end moment in FIG. 9). Upon the operating conditions changing, even if the situation arises in which the motor shaft gear reaches the backlash end for any cause during backlash correction amount addition, it is possible to perform reversal correction as appropriate by suspending correction by the function of the present embodiment.

Second Embodiment

Figure 3:
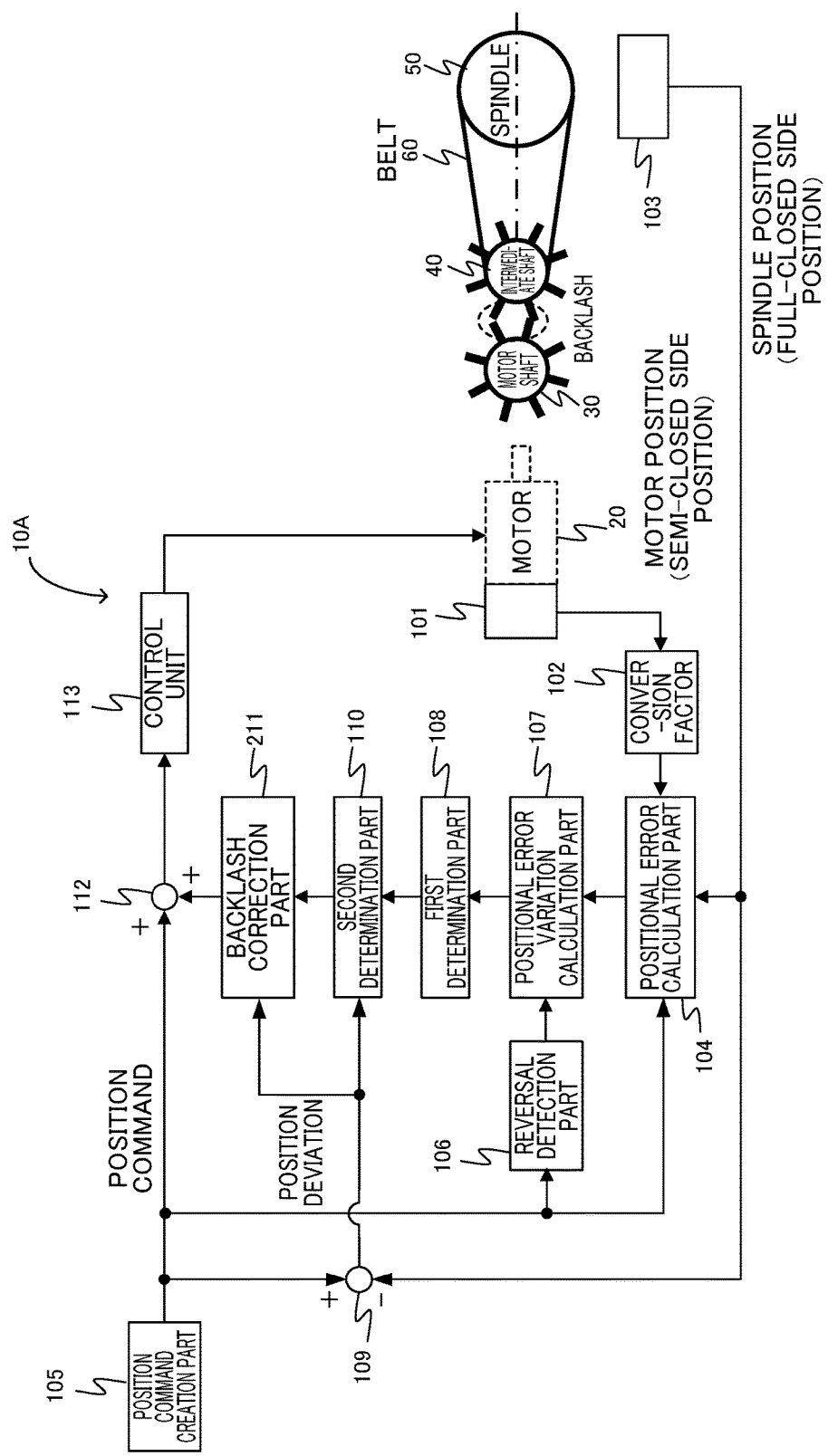
FIG. 3 is a diagram showing the configuration of a motor control device according to a second embodiment of the present invention.

FIG. 3 is a view showing the configuration of a motor control device 10A according to a second embodiment. It should be noted that the same reference symbols are used for constituent elements that are identical to the motor control device 10 according to the first embodiment, and a concrete explanation thereof will be omitted.

The motor control device 10A of the second embodiment includes a backlash correction part 211 in place of the backlash correction part 111 of the motor control device 10 according to the first embodiment. The backlash correction part 211 receives the position deviation of a driven part from the position deviation calculation part 109, and based on this position deviation and an instruction from the second determination part 110, causes the backlash correction amount to decrease during backlash correction.

Figure 4:
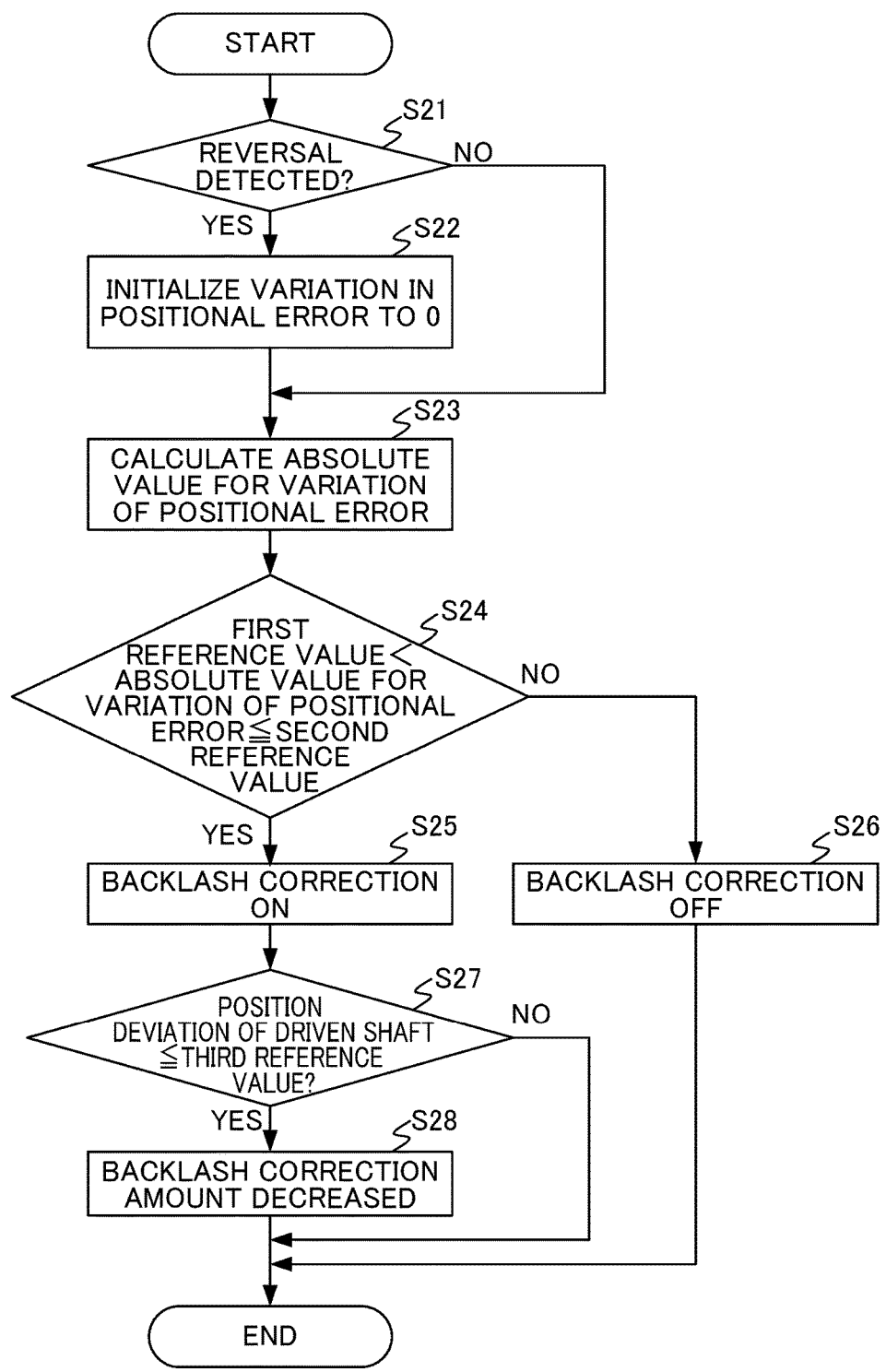
FIG. 4 is a flowchart showing processing of the motor control device according to the second embodiment of the present invention.

Next, although partially repeating, the operational flow of the above-mentioned motor control device 10A will be explained using FIG. 4.

First, the reversal detection part 106 monitors reversal in the position command created by the position command creation part 105 (Step S21). In the case of reversal being detected (Step S21: YES), the positional error variation calculation part 107 initializes the variation of the positional error to 0 (Step S22). Then, the positional error variation calculation part 107 calculates the absolute value for the variation of the positional error (Step S23). On the other hand, in the case of reversal of the position command not being detected (Step S21: NO), the positional error variation calculation part 107 calculates the absolute value for the variation of the positional error, without passing through the initializing step of Step S22 again.

Next, the first determination part 108 compares the absolute value for the variation of the above-mentioned positional error with the predetermined first reference value and the predetermined second reference value (Step S24). In a case of this absolute value exceeding the first reference value and being no more than the second reference value (Step S24: YES), the backlash correction part 211 adds the backlash correction amount to the position command. In other words, the backlash correction is turned ON (Step S25). In the case of the above-mentioned absolute value being no more than the first reference value, and in the case of exceeding the second reference value (Step S24: NO), the backlash correction part 211 does not add the backlash correction amount to the position command. In other words, the backlash correction is turned OFF (Step S26).

Next, the second determination part 110 compares the above-mentioned position deviation with the predetermined third reference value (Step S27). In the case of the above-mentioned deviation being no more than the third reference value (Step S27: YES), the backlash correction part 211 causes the backlash correction amount added to the position command to incrementally decrease. In the case of the above-mentioned position deviation exceeding the third reference value (Step S27: NO), decreasing of the backlash correction amount is not conducted.

Similarly to the motor control device 10 according to the first embodiment, the sign of the position deviation of the driven shaft no longer inverts, and it becomes possible to prevent the backlash correction from becoming excessive correction, by way of the above-mentioned motor control device 10A according to the second embodiment. In addition, upon the operating condition changing, even if the situation arises in which the motor shaft gear reaches the backlash end for any cause during backlash correction amount addition, it is possible to perform reversal correction as appropriate by causing the correction amount to decrease by the function of the present embodiment.

Modified Example

Figure 5:
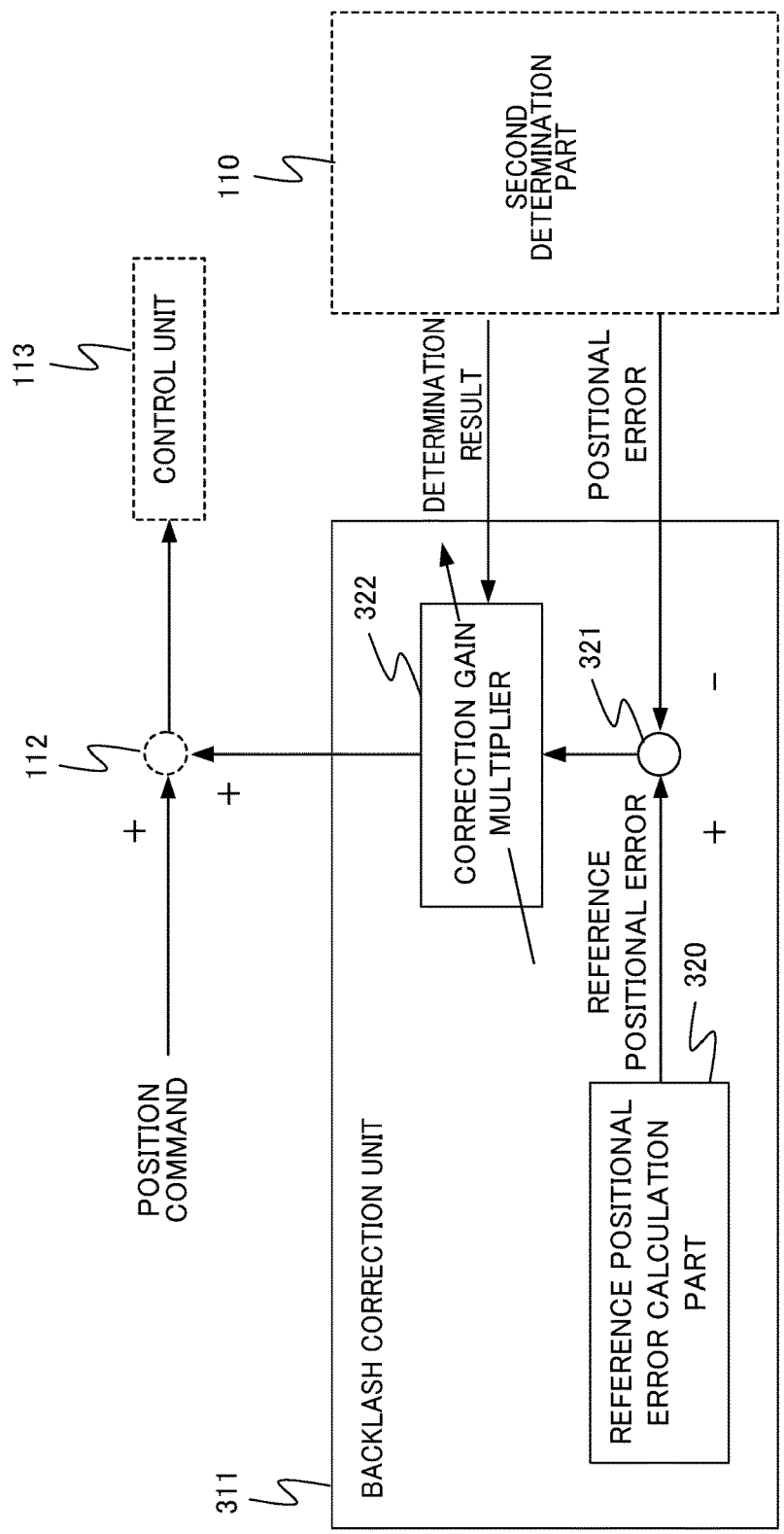
FIG. 5 is a diagram showing the configuration of a feedback control unit equipped to the motor control device according to a modified example of the present invention.

The motor control device 10A according to the second embodiment may include a backlash correction part 311 shown in FIG. 5, in place of the backlash correction part 211. The backlash correction part 311 shown in FIG. 5 includes a reference positional error calculation part 320, deviation calculator 321, and correction gain multiplier 322. The reference positional error calculation part 320 calculates the reference positional error which is the set point at which the positional error should reach after reversal of the motor 20. The deviation calculator 321 calculates the deviation between this reference positional error and the actual positional error received through the second determination part 110 from the positional error calculation part 104. The correction gain multiplier 322 calculates the backlash correction amount by multiplying the correction gain set in advance by this deviation. Along with this, the correction gain multiplier 322 causes the correction gain to monotonically decrease accompanying time elapse, in the case of receiving determination results of whether or not the position deviation of the driven shaft has become no more than the third reference value from the second determination part 110, and the position deviation becoming no more than the third reference value. Furthermore, if the position deviation reaches the position deviation of when starting correction, the correction gain multiplier 322 sets the correction gain to zero.

Also in this modified example, similarly to the motor control device 10A according to the above-mentioned second embodiment, the position deviation of the driven shaft will no longer assume a negative value, and it is possible to prevent backlash correction from becoming excessive correction. In addition, upon the operating conditions changing, even if the situation arises in which the motor shaft gear reaches the backlash end for any cause during backlash correction amount addition, it is possible to perform reversal correction as appropriate by suspending correction by the function of the present embodiment.

Although embodiments of the present invention have been explained above, the present invention is not to be limited to the aforementioned embodiments. In addition, the effects described in the present embodiment are merely listing the most preferred effects produced from the present invention, and the effects according to the present invention are not to be limited to those described in the present embodiment.

The control methods according to the motor control device 10, 10A are realized by software. In the case of being realized by software, the programs constituting this software are installed to a computer (motor control device 10, 10A). In addition, these programs may be recorded onto removable media and distributed to the user, or may be distributed by being downloaded to the user's computer via a network. Furthermore, these programs may be provided to the user's

EXPLANATION OF REFERENCE NUMERALS 10, 10A motor control device
20 motor
30 motor shaft (movable part)
35 motor shaft gear
40 intermediate shaft
45 intermediate shaft gear
50 spindle (driven part)
60 belt
101 first position detection part
102 conversion factor
103 second position detection part
104 positional error calculation part
105 position command creation part
106 reversal detection part
107 positional error variation calculation part
108 first determination part
109 position deviation calculation part
110 second determination part
111, 211, 311 backlash correction part
112 adder
113 control unit
320 reference positional error calculation part
321 deviation calculator
322 correction gain multiplier
351, 352, 451, 452 tooth

What is claimed is:

1. A motor control device for correcting backlash between a movable part that is driven by a motor, and a driven part that is driven by the movable part, the device comprising:
a first position detection part that detects a first position which is a position of the movable part;
a second position detection part that detects a second position which is a position of the driven part;
a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;
a position command creation part that creates a position command;
a reversal detection part that detects reversal of the position command;
a positional error variation calculation part that calculates a variation of the positional error since reversal being detected;
a first determination part that determines whether variation of the positional error exceeds a predetermined first reference value, or a predetermined second reference value;
a position deviation calculation part that calculates position deviation which is a difference between the position command and the second position detected value;
a second determination part that determines whether the position deviation has become no more than a predetermined third reference value; and
a backlash correction part that adds a backlash correction amount to the position command,
wherein the backlash correction part starts addition of the backlash correction amount when the variation of the positional error exceeds the first reference value, the backlash correction part ends the addition of the backlash correction amount when the variation of the positional error exceeds the second reference value, and the backlash correction part suspends the addition of the backlash correction amount when the position deviation becomes no more than the third reference value during correction.

2. The motor control device according to claim 1, wherein the third reference value is a position deviation of when starting correction.

3. The motor control device according to claim 1, wherein the movable part driven by the motor and the driven part driven by the movable part are mechanically coupled by a combination of gears and a belt.

4. A motor control device for correcting backlash between a movable part that is driven by a motor, and a driven part that is driven by the movable part, the device comprising:
a first position detection part that detects a first position which is a position of the movable part;
a second position detection part that detects a second position which is a position of the driven part;
a positional error calculation part that calculates positional error, which is deviation between a converted first position detected value arrived at by converting a first position detected value detected by the first position detection part into a value of a position of the driven part according to a rotation ratio between the movable part and the driven part; and a second position detected value detected by the second position detection part;
a position command creation part that creates a position command;
a reversal detection part that detects reversal of the position command;
a positional error variation calculation part that calculates a variation of the positional error since reversal being detected;
a first determination part that determines whether variation of the positional error exceeds a predetermined first reference value, or a predetermined second reference value;
a position deviation calculation part that calculates position deviation which is a difference between the position command and the second position detected value;
a second determination part that determines whether the position deviation has become no more than a predetermined third reference value; and
a backlash correction part that adds a backlash correction amount to the position command,
wherein the backlash correction part starts addition of the backlash correction amount when the variation of the positional error exceeds the first reference value, the backlash correction part ends the addition of the backlash correction amount when the variation of the positional error exceeds the second reference value, and the backlash correction part incrementally decreases a correction amount to be added when the position deviation becomes no more than the third reference value during correction.

5. The motor control device according to claim 4, wherein the backlash correction part includes a reference positional error calculation part that calculates a reference positional error which is a set point to which the positional error should reach after reversal, and a multiplier that sets a value arrived at by multiplying a correction gain set in advance by deviation between the reference positional error and the positional error as the backlash correction amount, and wherein the backlash correction part causes the correction gain to monotonically decrease accompanying time elapse if the position deviation is no more than the third reference value, and the backlash correction part sets the correction gain to zero if the position deviation reaches a position deviation of when starting correction.

6. A method for controlling a motor that corrects for backlash between a movable part that is driven by a motor and a driven part that is driven by the movable part, the method comprising the steps executed by a computer of:

detecting a first position which is a position of the movable part;

detecting a second position which is a position of the driven part;

calculating a positional error which is a deviation between a converted first position detected value arrived at by converting a detected value of the first position into a value of a position of the driven part according to a rotation ratio between the movable part and the driven part, and a detected value of the second position;

creating a position command;

detecting reversal of the position command;

calculating variation of the positional error since reversal being detected;

determining whether the variation of the positional error has exceeded a predetermined first reference value or a predetermined second reference value;

calculating a position deviation which is a difference between the position command and a detected value of the second position;

determining whether the position deviation has become no more than a predetermined third reference value; and adding a backlash correction amount to the position command, wherein the method starts addition of the backlash correction amount is started when the variation of the positional error exceeds the first reference value, ends the addition of the backlash correction amount when the variation of the positional error exceeds the second reference value, and suspends the addition of the backlash correction amount when the position deviation becomes no more than the third reference value during correction.

7. The method for controlling a motor according to claim 6, wherein the third reference value is a position deviation of when starting correction.

8. A method for controlling a motor that corrects for backlash between a movable part that is driven by a motor and a driven part that is driven by the movable part, the method comprising the steps executed by a computer of:

detecting a first position which is a position of the movable part;

detecting a second position which is a position of the driven part;

calculating a positional error which is a deviation between a converted first position detected value arrived at by converting a detected value of the first position into a value of a position of the driven part according to a rotation ratio between the movable part and the driven part, and a detected value of the second position;

creating a position command;

detecting reversal of the position command;

calculating variation of the positional error since reversal being detected;

determining whether the variation of the positional error has exceeded a predetermined first reference value or a predetermined second reference value;

calculating a position deviation which is a difference between the position command and a detected value of the second position;

determining whether the position deviation has become no more than a predetermined third reference value; and adding a backlash correction amount to the position command, wherein the method starts addition of the backlash correction amount when the variation of the positional error exceeds the first reference value, ends the addition of the backlash correction amount when the variation of the positional error exceeds the second reference value, and incrementally decreases a correction amount to be added when the position deviation becomes no more than the third reference value during correction.

9. The method for controlling a motor according to claim 8, wherein the step of adding the backlash correction amount to the position command includes a step of calculating a reference positional error which is a set point to which the positional error should reach after reversal, and a step of setting a value arrived at by multiplying a correction gain set in advance by deviation between the reference positional error and the positional error as the backlash correction amount, and wherein the correction gain is monotonically decreased accompanying time elapse if the position deviation becomes no more than the third reference value, and the correction gain is set to zero if the position deviation reaches a position deviation of when starting correction.

10. A non-transitory computer readable medium recording a motor control program for correcting backlash between a movable part that is driven by a motor and a driven part that is driven by the movable part, the program enabling a computer to execute the steps of:

detecting a first position which is a position of the movable part;

detecting a second position which is a position of the driven part;

calculating a positional error which is a deviation between a converted first position detected value arrived at by converting a detected value of the first position into a value of a position of the driven part according to a rotation ratio between the movable part and the driven part, and a detected value of the second position;

creating a position command;

detecting reversal of the position command;

calculating variation of the positional error since reversal being detected;

determining whether the variation of the positional error has exceeded a predetermined first reference value or a predetermined second reference value;

calculating a position deviation which is a difference between the position command and a detected value of the second position;

determining whether the position deviation has become no more than a predetermined third reference value; and adding a backlash correction amount to the position command, wherein the program starts addition of the backlash correction amount when the variation of the positional error exceeds the first reference value, ends the addition of the backlash correction amount when the variation of the positional error exceeds the second reference value, and suspends the addition of the backlash correction amount when the position deviation becomes no more than the third reference value during correction.

11. The non-transitory computer readable medium recording a motor control program according to claim 10, wherein the third reference value is a position deviation of when starting correction.

12. A non-transitory computer readable medium recording a motor control program for correcting backlash between a movable part that is driven by a motor and a driven part that is driven by the movable part, the program enabling a computer to execute the steps of:

detecting a first position which is a position of the movable part;

detecting a second position which is a position of the driven part;

calculating a positional error which is a deviation between a converted first position detected value arrived at by converting a detected value of the first position into a value of a position of the driven part according to a rotation ratio between the movable part and the driven part, and a detected value of the second position;

creating a position command;

detecting reversal of the position command;

calculating variation of the positional error since reversal being detected;

determining whether the variation of the positional error has exceeded a predetermined first reference value or a predetermined second reference value;

calculating a position deviation which is a difference between the position command and a detected value of the second position;

determining whether the position deviation has become no more than a predetermined third reference value; and adding a backlash correction amount to the position command, wherein the program starts addition of the backlash correction amount when the variation of the positional error exceeds the first reference value, ends the addition of the backlash correction amount when the variation of the positional error exceeds the second reference value, and incrementally decreases a correction amount to be added when the position deviation becomes no more than the third reference value during correction.

13. The non-transitory computer readable medium recording a motor control program according to claim 12, wherein the step of adding the backlash correction amount to the position command includes a step of calculating a reference positional error which is a set point to which the positional error should reach after reversal, and a step of setting a value arrived at by multiplying a correction gain set in advance by deviation between the reference positional error and the positional error as the backlash correction amount, and wherein the correction gain is monotonically decreased accompanying time elapse if the position deviation becomes no more than the third reference value, and the correction gain is set to zero if the position deviation reaches a position deviation of when starting correction.

* * * * *